3,314,765
BACTERIOLOGICAL DIGESTERS FOR CONVERSION OF ORGANIC WASTE
James W. Abson, Cheadle Heath, Stockport, and David Broadhurst, Cheadle Hulme, England, assignors to Simon Handling Engineers Limited, Stockport, England, a British company
Filed Feb. 7, 1964, Ser. No. 343,303
Claims priority, application Great Britain, Feb. 12, 1963, 5,584/63
6 Claims. (Cl. 23—259.1)

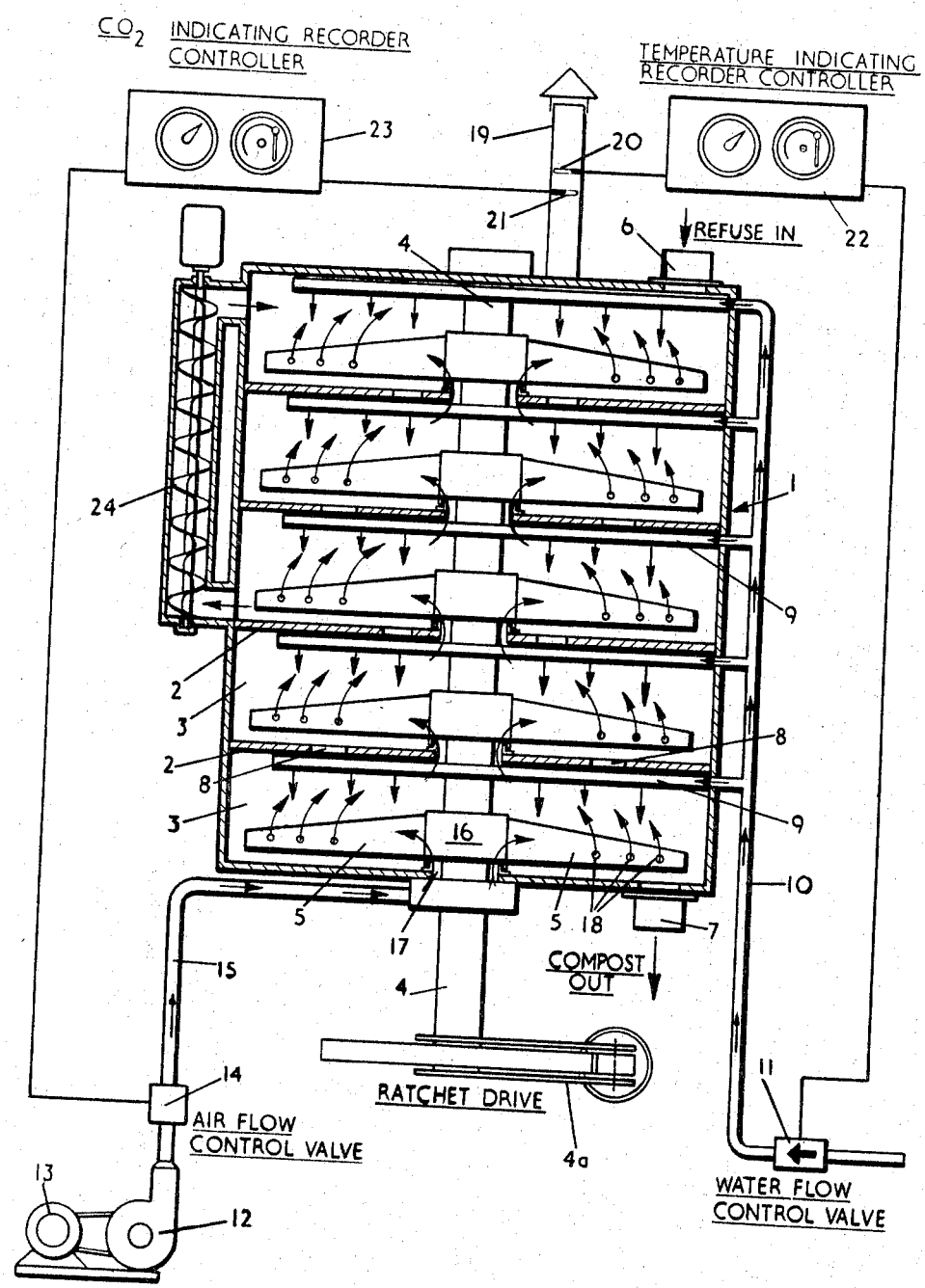

This invention relates to vertical tower type bacteriological digesters for the composting of municpal refuse and has for its object the provision of automatic self-controlling means whereby the process of conversion of organic material in the refuse is continuously maintained in an optimum condition.

According to the present invention, there is provided a method of operating a vertical tower type bacteriological digester for the composting of municipal refuse wherein the temperature and the carbon dioxide content of the exhaust gases are measured and the quantities of water and air fed to the digester are automatically controlled in accordance respectively with the said measurements.

An embodiment of the invention will now be described with reference, by way of example, to the accompanying drawing, which is a schematic vertical section of a digester.

The bacteriological digester shown comprises a relatively tall hollow cylinder 1 which is internally sub-divided by horizontal plates 2 to form a pluarilty of superimposed drum-shaped compartments 3. A co-axial rotatable shaft 4 driven by a rachet drive 4a passes through all compartments from bottom to top of the cylinder, which shaft 4 has fixed arm elements 5 in each compartment arranged to sweep over the compartment dividing plate 2. At the top of the cylinder there is an inlet port 6 for the reception or organic material to be acted upon and at the bottom of the cylinder an outlet port 7 for the discharge of treated material, there being transfer ports 8 in each dividing plate whereby material from a higher level may pass to a lower level. In the upper part of each drum-shaped compartment there is an inlet sprinkler pipe 9 whereby moisture in the from of water or ammonical liquor or sewerage sludge or the like may be admitted to the material in the compartment, the moisture flowing to pipes 9 via a manifold pipe 10 from a control valve 11. Air from a blower 12 driven by an electric motor 13, is admitted via a control valve 14 and duct 15 to the bottom of the cylinder. The arm elements 5 each incorporate a gas-channel extension of a co-axial annular gas receiving chamber 16 wherein gas is received from an inlet 17 communicating with a lower compartment 3 or source of air, the gas-channel extension having a plurality of transverse outlet openings 18 in the arm element whereby the gas is fed into the mass of material in the proximity of the moving arm element. In this way the air and gases of decomposition are caused to pass successively through each superimposed compartment 3 to a gas outlet port 19 at the top of the cylinder. In association with the gas outlet port 19, means 20 and 21 are provided respectively for detecting changes in the temperature and in the composition of the exhaust gas flowing through the said port. Temperature change detecting means 20 is arranged to motivate indicating and recording apparatus 22 in accordance with the temperature of the exhaust gas which apparatus 22 at the extremes of a predetermined value tolerance range causes adjustment of the control valve 11 that controls the flow of moisture via pipes 10 and 9 to the compartments 3 of the cylinder. The gas composition change detecting means 21 is arranged to motivate indicating and recording apparatus 23 in accordance with changes in the proportion of carbon dioxide ($CO_2$) present in the exhaust gas which apparatus 23 at the extremes of a predetermined value tolerance range causes adjustment of the control valve 14 that controls the flow of air into the bottom of the cylinder.

A worm conveyor 24 is provided whereby a relatively small quantity of bacteriologically active material may be continuously withdrawn from an intermediate compartment where such activity is at a maximum and fed back into the top compartment to stimulate the growth of bacteriological activity in material recently received in the digester.

As far as possible, the transfer ports 8 in the sub-dividing plaes 2 between compartments are alternately placed near the floor periphery and near its centre and the arm elements 5 which sweep over the floor-plates of the respective compartments are so shaped as to cause the material which they displace to move towards the related transfer ports, the arrangement being such that material progressing through the digester will follow the longest and most devious path.

In operation, the in-feed of untreated material and of bacteriologically active material, and the valves 14 and 11 which regulate respectively the input of air and moisture to the digester are manually adjusted until an optimum condition of operation is achieved and thereafter the process is automatically controlled by the means 20 and 21 which detect changes in the condition of the exhaust gas passing out of the digestion cylinder so that, for example, if the temperature rises more than a predetermined amount additional moisture is fed into the cylinder compartments to replace excessive evaporation losses or conversely, if the temperature falls below a predetermined level additional moisture is fed into the compartments to stimulate bacteriological activity, the increased moisture feed in either case being reduced to normal when the gas temperature restores to within the acceptable tolerance range. Similarly, if the proportion of $CO_2$ in the exhaust gas rises above or falls below the optimum condition by more than the predetermined acceptable tolerance ranges the supply of air into the bottom of the digester cylinder is increased until a condition of normality is achieved.

There may be provided about the cylinder a capped cylindrical heat-insulating sheath structure which is so spaced away from the cylinder wall as to provide an annular air-space through which gas from the gas outlet port at the top of the cylinder is led so that it flows downwardly over the outer surface of the cylinder wall to outlet openings at the bottom of the annular air space, the said gas thus assisting in the protection of the digestion plant from the effects of short term variations in atmospheric temperature conditions.

What is claimed is:
1. A bacteriological digester for the conversion of organic material comprising a relatively tall hollow cylinder having an inlet at its top to receive organic material to be treated and an outlet at its bottom to discharge the treated organic material, a plurality of horizontal plates within the cylinder to subdivide it into a plurality of superimposed drum-shaped compartments each plate being formed with at least one transfer port to permit downward flow of organic material, co-axial rotating shaft means passing through all the compartments from top to bottom of the cylinder, arm elements in each compartment and secured to the shaft means to sweep over the horizontal plates, means for delivering moisture into the upper part of each compartment and including a flow control valve, means for feeding air to the bottom of the cylinder and including a flow control valve, delivery means in each compartment in communication with the air-feeding means to distribute the air throughout the cylinder, port means at the cylinder top for permitting egress of gas from the cylinder, a first detector means at the gas port means for detecting changes in the composition of the exhausting gas, first actuating means operatively connecting the first detector means and the flow control valve of the air-feeding means to operate the valve in accordance with changes in the proportion of carbon dioxide present in the exhausting gas at the extremes of a predetermined value tolerance range to vary the quantity of air fed to the cylinder compartments, a second detector means at the gas port means for detecting changes in the temperature of the exhausting gas, and second actuating means operatively connecting the second detector means and the flow control valve of the moisture to operate the valve in accordance with the temperature of the exhausting gas at the extremes of a predetermined value tolerance range to vary the quantity of moisture delivered to the cylinder compartments.

2. A bacteriological digester as claimed in claim 1, comprising means for withdrawing a relatively small quantity of bacteriologically active material from an intermediate compartment where such activity is at a maximum, and for feeding said small quantity back into the top compartment to stimulate the growth of bacteriological activity in material recently received in the digester.

3. A bacteriological digester as claimed in claim 2, wherein said means for feeding back active material includes a worm conveyor.

4. A bacteriological digester as claimed in claim 1, wherein the transfer ports in the sub-dividing plates between compartments are alternately placed near the floor periphery and near its centre, and the arm elements which sweep over the floor-plates of the respective compartments cause the material which they displace to move towards the related transfer ports, the arrangement being such that material progressing through the digester will follow a long and devious path.

5. A bacteriological digester as claimed in claim 4, wherein the arm elements of the rotating shaft each incorporate a gas-channel extension of a co-axial annular gas receiving chamber wherein gas is received from an inlet communicating with a lower compartment or source of air, the said gas-channel extension having a plurality of outlet openings whereby the gas is fed into the mass of material in the proximity of the moving arm.

6. A bacteriological digester as claimed in claim 5, comprising a capped cylindrical heat-insulating sheath structure provided about the cylinder and spaced away from the cylinder wall to provide an annular air-space through which gas from the gas outlet port at the top of the cylinder is led so that it flows downwardly over the outer surface of the cylinder wall to outlet openings at the bottom of the annular air space, the said gas thus assisting in the protection of the digestion plant from the effects of short term variations in atmospheric temperature conditions.

References Cited by the Examiner
UNITED STATES PATENTS

| | | | |
|---|---|---|---|
| 2,474,833 | 7/1949 | Eweson | 71—9 |
| 2,639,902 | 5/1953 | Kuebler | 71—9 |
| 2,878,112 | 3/1959 | Morrison | 71—9 |
| 2,929,688 | 3/1960 | Riker et al. | 23—259.1 |
| 2,954,285 | 9/1960 | Carlsson et al. | 71—9 |
| 3,010,801 | 11/1961 | Schulze | 23—259.1 |

DONALL H. SYLVESTER, *Primary Examiner.*

ANTHONY SCIAMANNA, J. H. NEWSOME,
*Assistant Examiners.*